Dec. 16, 1924.  
G. B. MENTZ  
1,519,150  
BRICK MOLD  
Filed Jan. 26, 1923
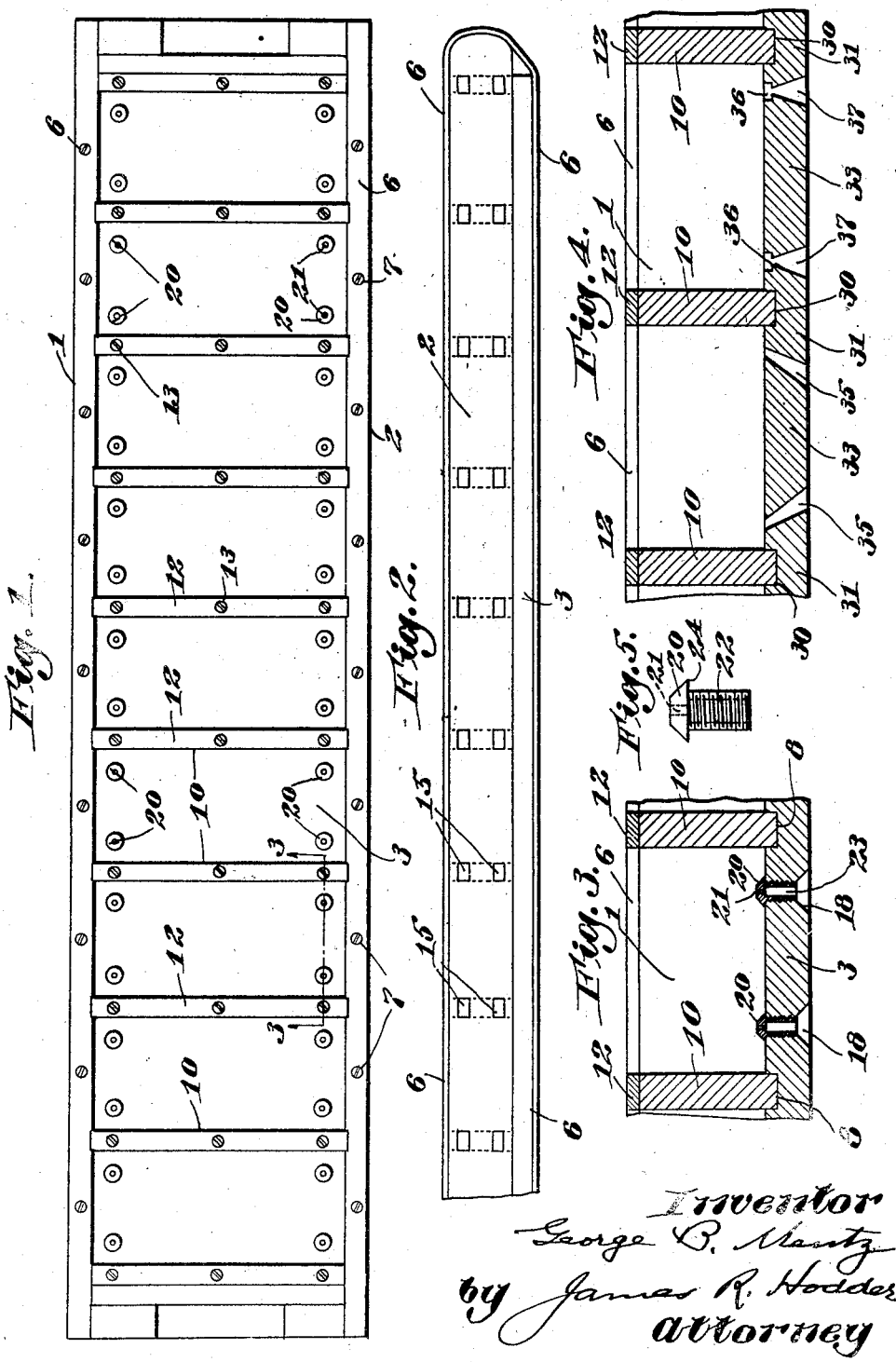

Patented Dec. 16, 1924.

1,519,150

UNITED STATES PATENT OFFICE.

GEORGE B. MENTZ, OF WALLKILL, NEW YORK.

BRICK MOLD.

Application filed January 26, 1923. Serial No. 614,999.

*To all whom it may concern:*

Be it known that I, GEORGE B. MENTZ, a citizen of the United States, and resident of Wallkill, in the county of Ulster and State of New York, have invented an Improvement in Brick Molds, of which the following description, in connection with the accompanying drawings, is a specification, like letters on the drawings representing like parts.

My present invention is an improved and novel form of brick mold, particularly adapted for use in the manufacture of soft mud brick in braces or molds, and of special value when said molds are used with the present type of automatic and high-speed brick moulding machines.

Important objects of the invention are to provide a structure for brick molds which will give great strength to the same; will permit the use of relatively thin mold partitions; will insure great strength to relatively thin mold partitions, and will prevent the distortion of such partitions in the mold during the various operations to which said molds are subjected; and will enable a relatively greater number of moulded brick to be made in a single mold, because of the thinness of the separating partitions, and the great strength of the improved structure, than was formerly feasible. Thus by means of my present invention I am enabled to make molds with a capacity for eight or even nine brick, whereas formerly five or six was a maximum. It will be appreciated that in the use of the so-called automatic brick machines, where great speed and also great pressure are utilized to fill the molds, and where also larger molds are desirable than formerly, where the limit of size of a mold was determined by the weight and ability of operators to handle the same, an increased strength and capacity are both called for. Consequently the prior standard methods of brick mold construction, usually four or five brick to each mold, have been found to be unsuited for the stress and strains incident to the modern automatic brick moulding machine, and therefore were objectionable, and furthermore, such prior constructions, because of the inherent weakness, were not at all suitable for being made of larger capacity to take an increased number of clay receiving recesses, which was demanded by the automatic machines, viz., six or seven or more. This double demand and deficiency has presented an extremely difficult problem for the mold manufacturers to surmount, and the object of my present invention is to obviate these difficulties and furthermore to so improve and perfect a brick mold structure that extremely thin partitions between the mold recesses can be employed, said mold and partitions being braced and interlocked to withstand both the increased pressure of the press during the filling operations and also to prevent distortion or spring in the molds while thus being filled as well as during the subsequent bumping, inverting, dumping and other operations incident to the automatic brick-making machines.

It will be appreciated that brick molds must necessarily be made of wood, usually maple, and that the severe jarring and bumping as well as the entire work to which the mold is subjected, is greatly increased when the size and weight of the mold is increased and the number of brick for each mold. On the other hand the weight and size of these molds are necessarily limited and heretofore a large amount of the space longitudinally of the brick mold has necessarily been taken up by the partitions, the same being of greater size in cross-section with the increased weight, length and number of brick capacity for each mold. My invention, however, enables these partitions to be extremely thin, so much so in fact that the extra space heretofore required by them enables me to add an entire new brick capacity to the mold. Thus I get eight brick in each mold, where formerly the space permitted of seven only, and by means of my invention, enabling thin and strongly braced partitions to be utilized, I can make a mold with even nine brick therein, and one which will stand up under the requirements of a mold for the automatic machines now in use.

A further feature of the present invention consists in the arrangement and form of novel recesses in the bottom of the panels or back of the mold, as will be explained.

Further details of the invention, novel features and important advantages will be hereinafter more fully pointed out and claimed.

Referring to the drawings, illustrating a mold embodying my invention in its preferred form, Fig. 1 is a top or plan view of a nine-brick mold;

Fig. 2 is a portion of a side elevation;

Fig. 3 is an enlarged cross-sectional view on the line 3—3 of Fig. 1;

Fig. 4 is a similar view illustrating modifications in the outlet recesses; and

Fig. 5 is a view illustrating the threaded metal caps for the outlet recesses.

As illustrated in the drawings I form my mold with the usual wood sides indicated at 1 and 2, for a suitable length for the number of brick desired;—as herein shown nine panels being formed. I also form the back or bottom 3 of proper length and this may be continuous as illustrated in Fig. 2, the sides 1 and 2 and the bottom or back 3 being bound by iron straps 6 suitably secured by a plurality of screws 7 countersunk therein as is customary. The back 3 is grooved as shown at 8 to receive each transverse partition 10, the sides 1 and 2, back 3 and partitions 10 all being of wood to hold the sand and secure the advantages of wood construction, as is usual. These partitions are also bound by cross straps 12 of iron secured to each partition by screws 13 as illustrated. The cross straps 12 and side iron strap 6 may be interlocked or dovetailed, as is also usual.

By making the back 3 thus solid or substantially solid as shown in my preferred form in Figs. 1, 2 and 3, with the grooves 8 to receive the partitions 10, I secure the important advantages of supporting these partitions 10 throughout their entire extent, the portions of the back 3 under these partitions, resting over the mold support in the brick machine, during the filling operation. The dovetailed construction of the partitions 10 and grooves 8 furthermore serves to give rigidity to these partitions 10, preventing them from "springing" sideways, becoming disalined, distorted or otherwise displaced, and therefore permits the making of these partitions 10 of relatively thin wood in cross-section. Each end of these partitions is furthermore dovetailed into the sides 1 and 2 by the tenon and groove construction illustrated at 15, Fig. 2, as is customary, but these tenons in prior molds constituted the main support for the partitions and therefore these partitions had to be of relatively heavy wood, whereas in my improved construction it is the back 3 which constitutes the main support and the tenons 15 are incidental, being principally the brace for the sides 1 and 2 and to maintain the partitions in proper alined and vertical position. Prior to my invention there has been no necessity of making the partitions 10 relatively thin in order to increase capacity of the molds, and hence to prevent lateral distortion of these partitions, and heretofore the outlet recesses have usually been directly under the cross-partitions 10, thus giving a full panel to the back of each mold. In my arrangement I prefer to maintain the back 3 comparatively solid, and provide a plurality of outlet recesses 18, for being shown in balanced relation in each panel or back. I prefer also to fit in these recesses, which are flared at the bottom, a cap 20, having a central bored opening 21 through the top, and a threaded shank 22, the latter being counterbored and preferably of greater diameter than the opening 21 to facilitate clearing air or clay as shown at 23. The shank 22 being threaded is fitted solidly into the base 3, the head having an encircling flange 24 which rests upon the inner surface of the back 3, thus giving a firm and threaded engagement therewith. This construction is important because when the molds are inverted and subject to blows on the back 3 to release the clay or clear the same, an unthreaded cap would be driven out, and would furthermore be rendered loose by the alternate wetting and drying of the wood through the natural "give and take" of wooden construction. My improved mold thus permits of extremely thin partitions being utilized and yet a mold made of wood of increased strength and greatly increased capacity and one suitable for use in the largest of the modern automatic brick machines. The caps 20 protect the outlets 18, and provide suitable air recesses to facilitate removal of the molded brick upon inverting and "jarring" of the molds.

While I prefer to make the back 3 substantially solid as above indicated and with a plurality of caps and openings therethrough I may also form my improved and strengthened wooden brick mold with any usual type of flared outlet therein or as shown in the modification illustrated in Fig. 4. In this arrangement the sides and partitions 10 of the mold are of usual construction, the latter being fitted into the grooves 30 in the base members 31, which latter are positioned directly underneath each partition and constitute a supporting means therefor as well as a strengthening and interlocking construction entirely across the mold to prevent distortion sidewise of the partitions 10 and furthermore to permit making these partitions so thin as to increase the capacity of the mold if desired. In this form the back may comprise the supporting base 31 and the central panels 33, slots 35, 35, being arranged as outlets, or as illustrated at the right of Fig. 4, the counterbored openings 36 and flared slots 37 may be arranged, which latter arrangement I believe is distinctly novel.

In either construction I obtain the advantage incident to supporting the partitions 10 during the mold filling operation when the mold is under the press, and furthermore strengthening both the base and the partitions 10 by the grooved arrangement as shown at 8 or 30. By having these partitions 10 narrower, some appreciable weight is saved in the cross straps 12 which is of importance when a hand manipulated mold is considered, although this feature is not vital in a large mold handled by the machine in the automatic brick presses.

My invention is further described and defined in the form of a claim as follows:

A brick mold of the kind described including, in combination, a base, sides attached thereto, a plurality of relatively thin partitions mortised into both the base and sides whereby the partitions are maintained against side distortion due to pressure, a plurality of outlet openings arranged in balanced relation to the space defined in the base by the sides and partitions, and threaded metallic caps protecting said outlet openings.

In testimony whereof, I have signed my name to this specification.

GEORGE B. MENTZ.